(12) United States Patent
Suetani et al.

(10) Patent No.: US 6,459,943 B1
(45) Date of Patent: Oct. 1, 2002

(54) SEAL PRODUCING APPARATUS

(75) Inventors: Takuya Suetani, Tokyo (JP); Kiyoshi Ogawa, Tokyo (JP); Tomoyuki Shimmura, Tokyo (JP); Masahiko Nunokawa, Suwa (JP)

(73) Assignees: King Jim Co., Ltd. (JP); Seiko Epson Corporation (JP)

( * ) Notice: Subject to any disclaimer, the term of this patent is extended or adjusted under 35 U.S.C. 154(b) by 0 days.

(21) Appl. No.: 09/303,653

(22) Filed: May 3, 1999

(30) Foreign Application Priority Data

May 11, 1998 (JP) ................................................ 127177

(51) Int. Cl.$^7$ ............................................ G06F 19/00
(52) U.S. Cl. ........................... 700/96; 700/95; 700/117; 700/119; 400/83; 400/615.2; 400/61; 250/492.1; 430/5; 355/18; 358/1.11; 358/1.2; 358/1.18
(58) Field of Search ............................. 700/95, 96, 117, 700/119, 121; 400/83, 615.2, 61; 250/492.1; 430/5; 355/16; 101/35, 379, 368, 404.1; 358/1.11, 1.2, 1.18

(56) References Cited

U.S. PATENT DOCUMENTS

| | | | | |
|---|---|---|---|---|
| 5,644,136 A | * | 7/1997 | Kameda et al. | 250/492.1 |
| 5,745,222 A | * | 4/1998 | Kameda et al. | 355/100 |
| 5,878,668 A | * | 3/1999 | Ando et al. | 101/368 |
| 6,016,749 A | * | 1/2000 | Tukahara et al. | 101/401.1 |
| 6,025,051 A | * | 2/2000 | Yanagisawa et al. | 428/137 |
| 6,072,584 A | * | 6/2000 | Watanabe et al. | 358/1.11 |
| 6,125,303 A | * | 9/2000 | Hayama et al. | 430/5 |
| 6,129,467 A | * | 10/2000 | Toyosawa et al. | 400/61 |
| 6,226,094 B1 | * | 5/2001 | Watanabe et al. | 358/1.11 |
| 6,295,926 B1 | * | 10/2001 | Sodeyama et al. | 101/327 |

FOREIGN PATENT DOCUMENTS

| | | |
|---|---|---|
| JP | 615909 | 1/1994 |
| JP | 6-55800 | 3/1994 |
| JP | 6278350 | 10/1994 |

* cited by examiner

Primary Examiner—Ramesh Patel
(74) Attorney, Agent, or Firm—Lorusso & Loud

(57) ABSTRACT

A seal producing apparatus includes file storing and recalling procedures wherein calling of a file is permitted only when a seal loaded in the seal producing apparatus is a seal type having a shape and size suitable to contain the allowable number of lines and the allowable number of characters per line in the seal type associated with the file to be called and when the size of the seal type of the seal loaded in the seal producing apparatus is equal to or larger than the size of the seal type associated with the file to be called.

15 Claims, 10 Drawing Sheets

FIG.6    23d FILE MANAGEMENT TABLE

| FILE MANAGEMENT NUMBER | SEAL TYPE | REGISTRATION FLAG | HEAD ADDRESS | DATA LENGTH | PROXIMATE FLAG |
|---|---|---|---|---|---|
| 0 | | | | | |
| ⋮ | | | | | |
| 9 | | | | | |
| ⓪ | | | | | |
| ⋮ | | | | | |
| ⑨ | | | | | |

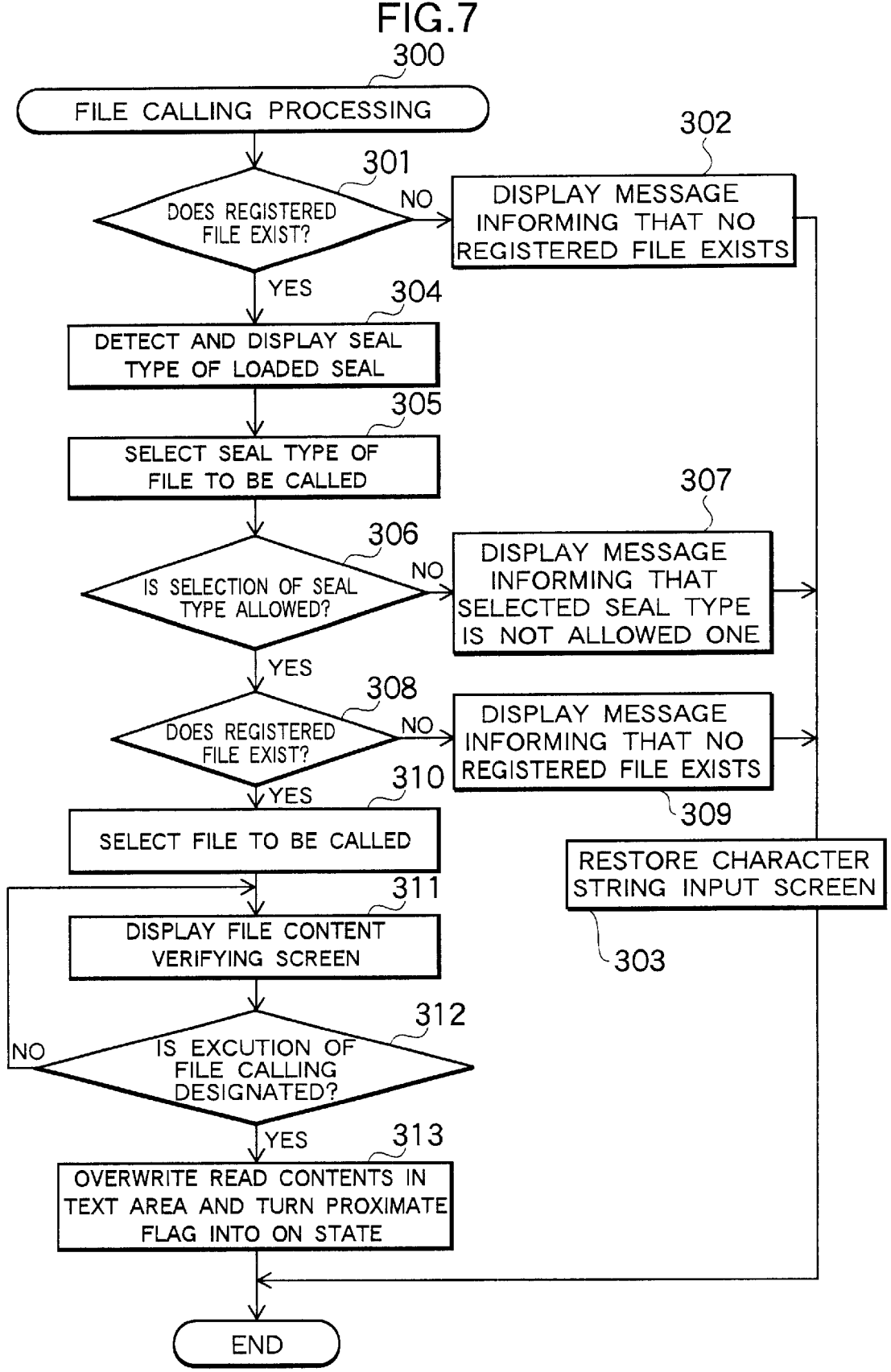

FIG.8  22b FILE CALLING CONDITION TABLE

| SEAL TYPE OF LOADED SEAL | SEAL TYPE ASSOCIATED WITH FILE TO BE CALLED | | | | | | | | |
|---|---|---|---|---|---|---|---|---|---|
| | PRIVATE SEAL (SMALL SIZE) | PRIVATE SEAL | RECTANGULAR SEAL(SMALL SIZE) | RECTANGULAR SEAL(MEDIUM SIZE) | ACCOUNTING SEAL | NAME SEAL | BUSINESS SEAL (SMALL SIZE) | BUSINESS SEAL (LAGE SIZE) | ADDRESS SEAL |
| PRIVATE SEAL (SMALL SIZE) | Y | N | N | N | N | N | N | N | N |
| PRIVATE SEAL | Y | Y | N | N | N | N | N | N | N |
| RECTANGULAR SEAL(SMALL SIZE) | Y | Y | Y | N | N | N | N | N | N |
| RECTANGULAR SEAL(MEDIUM SIZE) | Y | Y | Y | Y | N | N | N | N | N |
| ACCOUNTING SEAL | N | N | N | N | Y | N | N | N | N |
| NAME SEAL | N | N | N | N | Y | Y | N | N | N |
| BUSINESS SEAL (SMALL SIZE) | N | N | N | N | Y | Y | Y | N | N |
| BUSINESS SEAL (LAGE SIZE) | N | N | N | N | Y | Y | Y | Y | N |
| ADDRESS SEAL | N | N | N | N | Y | Y | Y | Y | Y |

Y···CALLING FILE IS ALLOWED
N···CALLING FILE IS NOT ALLOWED

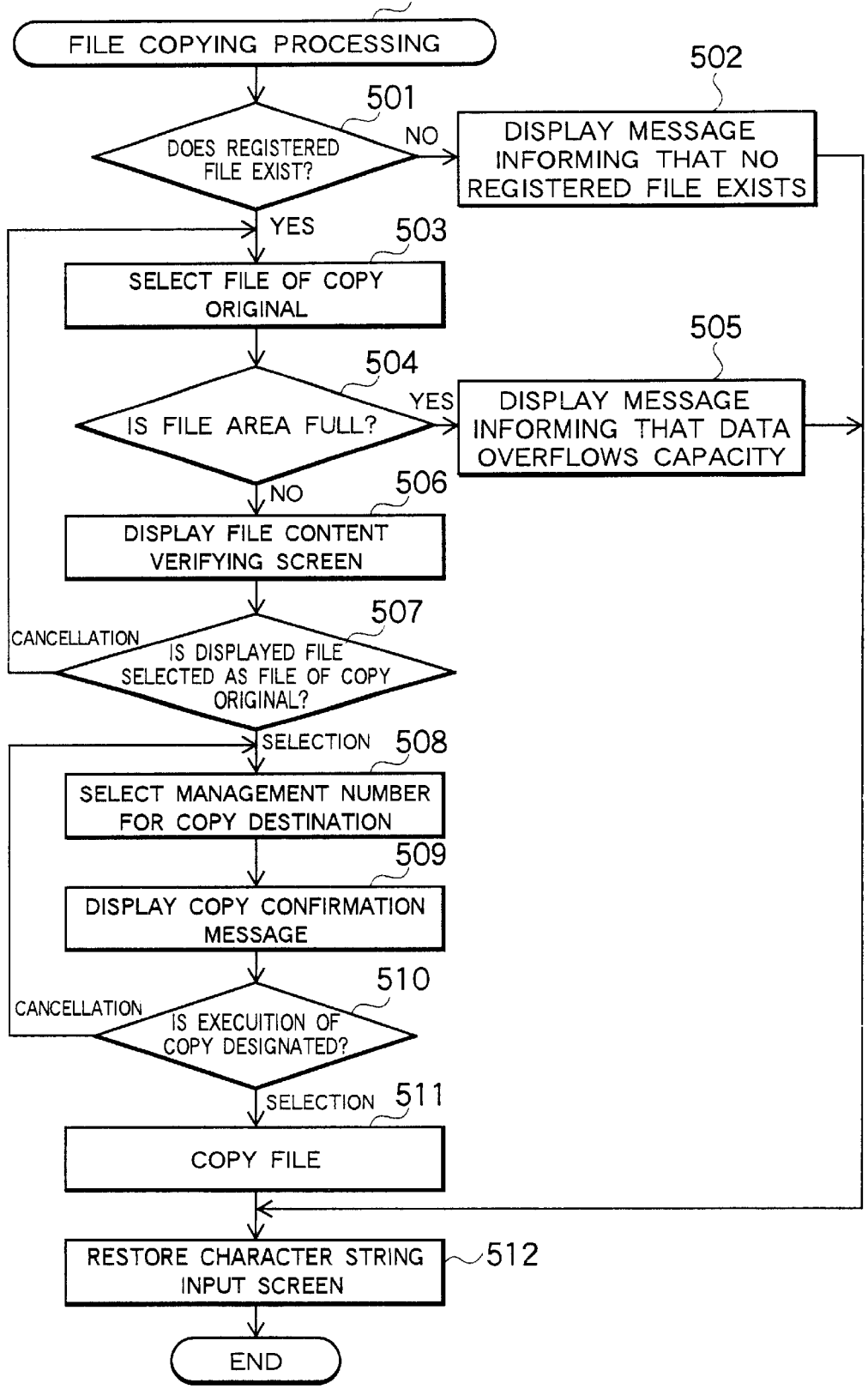

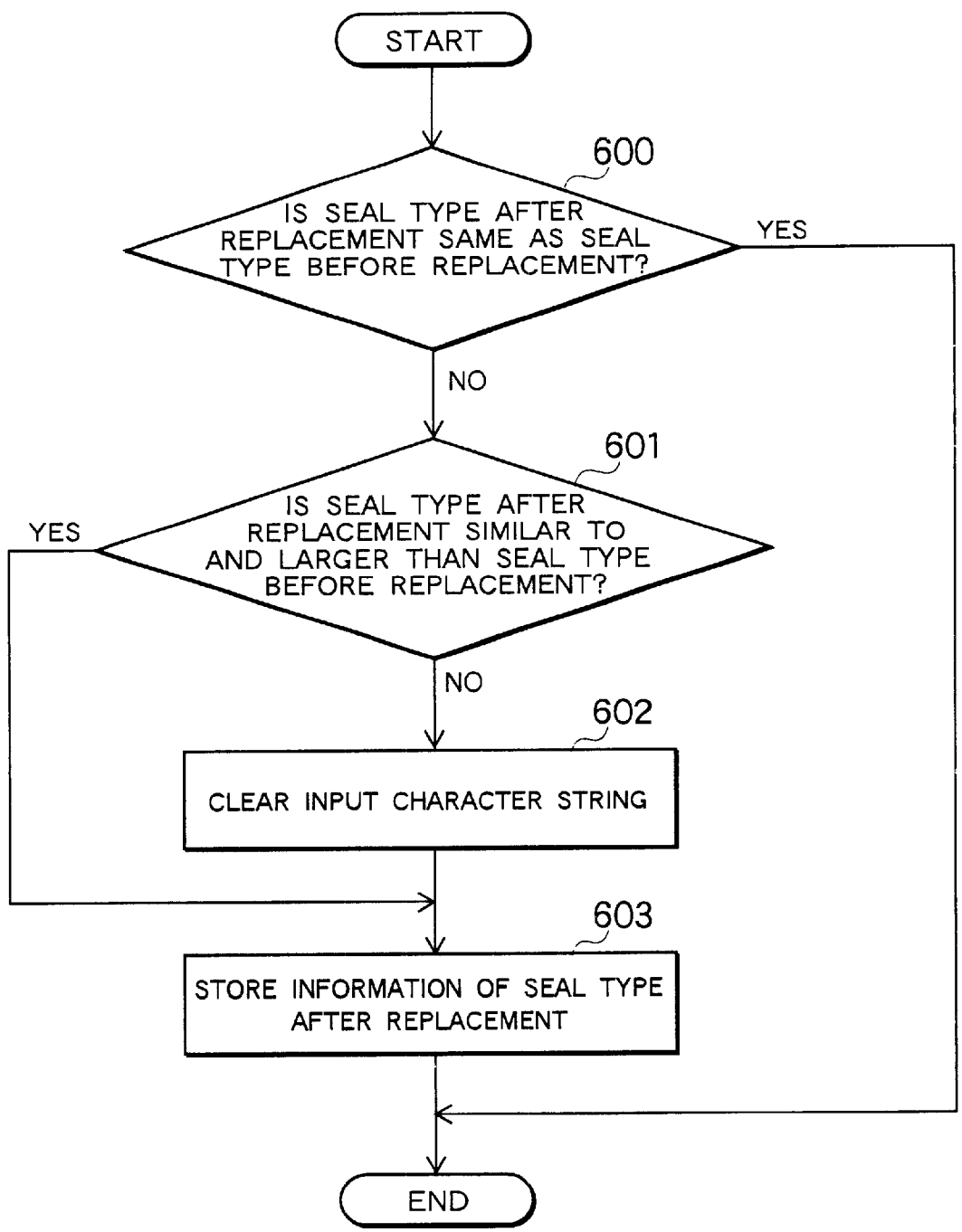

SEAL PRODUCING APPARATUS

BACKGROUND OF THE INVENTION

1. Field of the Invention

The present invention relates to a seal producing apparatus which is adapted to form an imprint pattern according to the input character string (the term "character string" as used herein includes symbols, pictographs, and the like) on a seal face member of a seal.

2. Discussion of Related Art

These days, seal producing apparatuses with which the user can readily make a seal have become prevalent in companies and homes. Such a seal producing apparatus has an input function similar to those of other types of information processors, such as personal computers, word processors, and the like.

Meanwhile, since such a seal producing apparatus deals with various types of seals (hereinafter type of a seal will be often referred to as "seal type"), the shape and size of a seal face member of a seal are varied according to seal types. That is, the number of lines (hereinafter, number of lines to be input will be often referred to as "line number") and the number of characters per line (hereinafter, number of characters per line will often referred to as "character number per line") allowed by a loaded seal (seal loaded in an apparatus is often referred to as "loaded seal") are determined by the seal type of the loaded seal.

In view of the above circumstances, in the conventional seal producing apparatus, when an imprint pattern according to the input character string is engraved on a seal on which an imprint pattern is not engraved (often referred to as "unengraved seal"), the following procedure is taken. Specifically, an input character string is input when an unengraved seal is loaded in the apparatus, and then the character string thus introduced is displayed at the display area of the display unit. Thereafter, the optical-mechanical members are activated under the state that the character string is displayed at the display area. Thereby, an imprint pattern according to the character string is engraved on the unengraved seal.

In the course of this procedure, if the loaded seal is replaced while the character string is being displayed at the display area, it is necessary to erase the entire input character string having been stored, and to thereafter input a new character string. This is because, in many cases, the allowable values of the line number and character number per line are different between the seal before the replacement and the seal after the replacement. Note that, if the seal type of the seal after the replacement is the same as the seal type of the seal before the replacement, the input character string may be engraved without any change or in the form in which a part of the input character string is changed.

For reference, in the case of a word processor, a character string is input after the sheet size is designated, similarly to the case of the seal producing apparatus. However, it is not necessary to erase the formerly input character string even after the sheet size is changed. This is because the word processor can easily cope with the change of the sheet size by changing the line number and/or character number per line.

Meanwhile, among a plurality of seal types, there are some seals which are similar to one another (Note that, in this specification and appended claims, when a geometrical figure A and a geometrical figure B have the same shape and different sizes, the geometrical figures A and B are referred to as "be similar", "be similarly-shaped" or "have a similar shape". This definition of the word "similar" and its related words is also applied to a seal, and son on). It often happens on such similar seals. For example, in a case where the user wishes to produce two similarly-shaped private seals of different sizes, the same family name of the user (i.e., the same character string) is engraved on the two similarly-shaped private seals. Here, a "private seal" is a seal which has, in general, a circular shape and on which a family name is engraved. In contrast, a "name seal" which appears later in this specification, is a seal which has a rectangular shaped and on which a first name and a family name are engraved.

In such a case, after completing forming the character string on one of the private seals, the user must erase the character string for the one private seal, and then must newly input a character string for the other private seal. This is because, in the conventional seal producing apparatus, when the loaded seal is replaced, the entire character string formerly input is erased.

Not only in the above-mentioned case where the same character string is engraved on two similarly-shaped seals, but also in a case where two different character strings which differ only in part are on two similar seals, if the user wishes to produce the other seal after completing the production of one seal, he must erase the character string formerly input and newly input the character string for the other seal, in the conventional seal producing apparatus.

As described above, in the conventional seal producing apparatus, the user cannot reuse the character string formerly used for one seal as for another seal, and therefore he must newly input a character string for another seal. Thus, the usability of the conventional apparatus is unfavorably poor.

Therefore, it has been strongly demanded to provide a seal producing apparatus in which all or a part of the character string used for one seal is reused as for another seal even when the allowable values of the input line number or the character number per line differ between the two seals.

SUMMARY OF THE INVENTION

It is therefore an object of the present invention to provide a seal producing apparatus in which all or a part of the character string used for one seal is reused for another seal even where the allowable values of the input line number or the character number per line differ between the two seals.

To achieve the above object, a first aspect of the present invention provides a seal producing apparatus in which an imprint pattern according to an input character string is formed on a seal face member of a seal, said seal producing apparatus comprising: (1) file storage means for storing, as a file, imprint information including information of a character string and information of a print attribute; (2) file management table which stores information used for managing storage state at the file storage means, the information stored in the file management table including information of seal type; and (3) file editing/managing means for managing and editing the file stored in the file storage means by using the information stored in the file management table.

Further, a second aspect of the present invention provides a seal producing apparatus in which an imprint pattern according to an input character string is formed on a seal face member of a seal, said seal producing apparatus comprising: (1) loaded-seal replacement detection means for detecting that a seal loaded in the seal producing apparatus is replaced in a character string input state; and (2) character string maintenance/deletion control means which maintains an input character string held before the replacement of the loaded seal when a predetermined relationship is established between seal types before and after the replacement of the loaded seal, but deletes the input character string held before the replacement of the loaded seal when the predetermined relationship is not established between seal types before and after the replacement of the loaded seal.

BRIEF DESCRIPTION OF THE DRAWINGS

Other features, objects and advantages of the present invention will become apparent from the following description of the preferred embodiments with reference to the drawings in which like reference characters designate like or corresponding parts throughout several views, and in which:

FIG. 6 is a view showing an example of an arrangement of a file management table according to an embodiment of the present invention;

FIG. 7 is a flowchart showing an example of a flow of file calling processing according to an embodiment of the present invention;

FIG. 8 is a view showing an example of an arrangement of a file calling condition table according to an embodiment of the present invention;

FIG. 10 is a flowchart showing an example of a flow of a file copying processing according to an embodiment of the present invention; and FIG. 11 is a flowchart showing an example of a flow of a seal replacement-time processing according to an embodiment of the present invention.

DETAILED DESCRIPTION OF THE INVENTION

Figure 2:
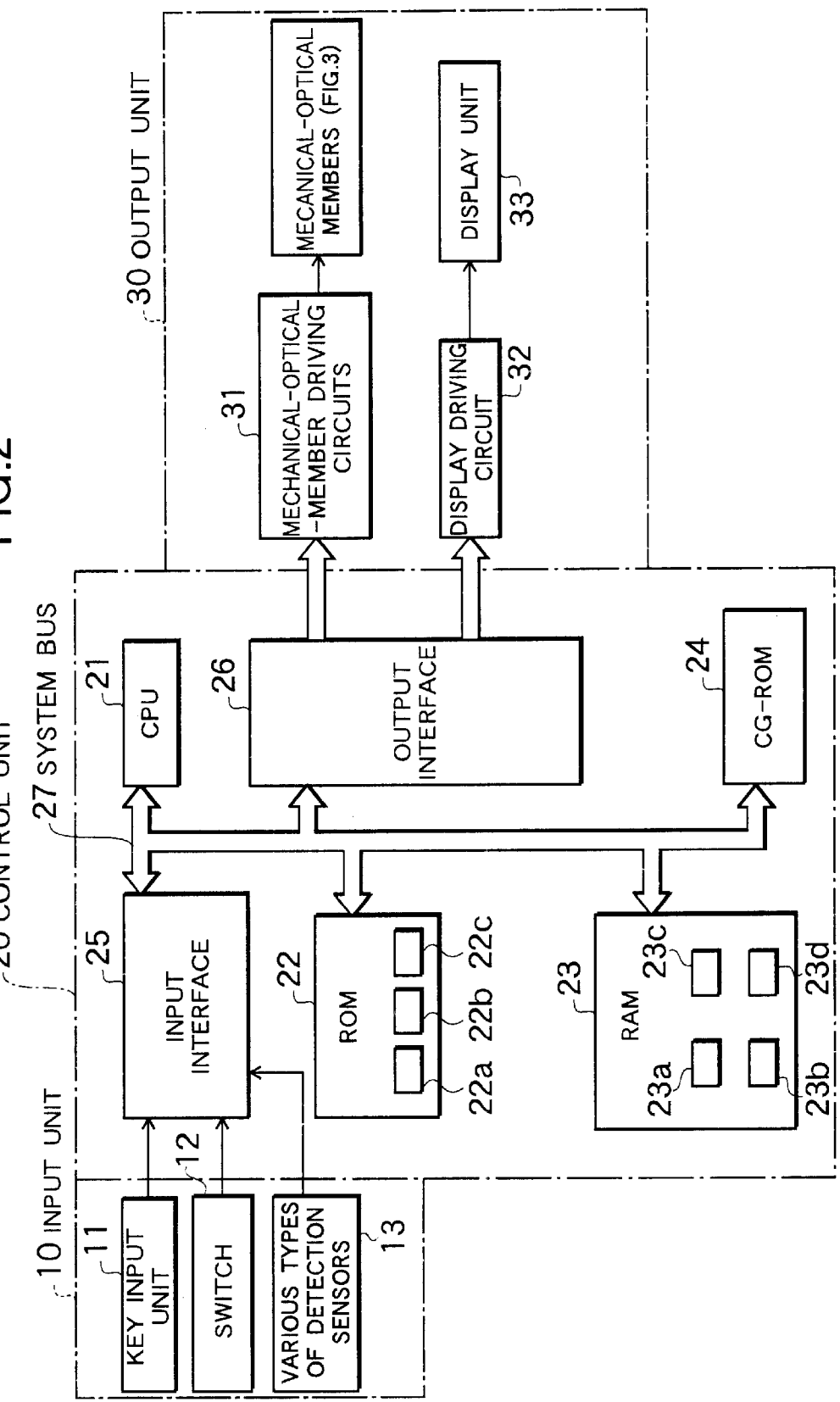
FIG. 2 is a block diagram showing arrangement of electrical members according to an embodiment of the present invention.
Figure 3:
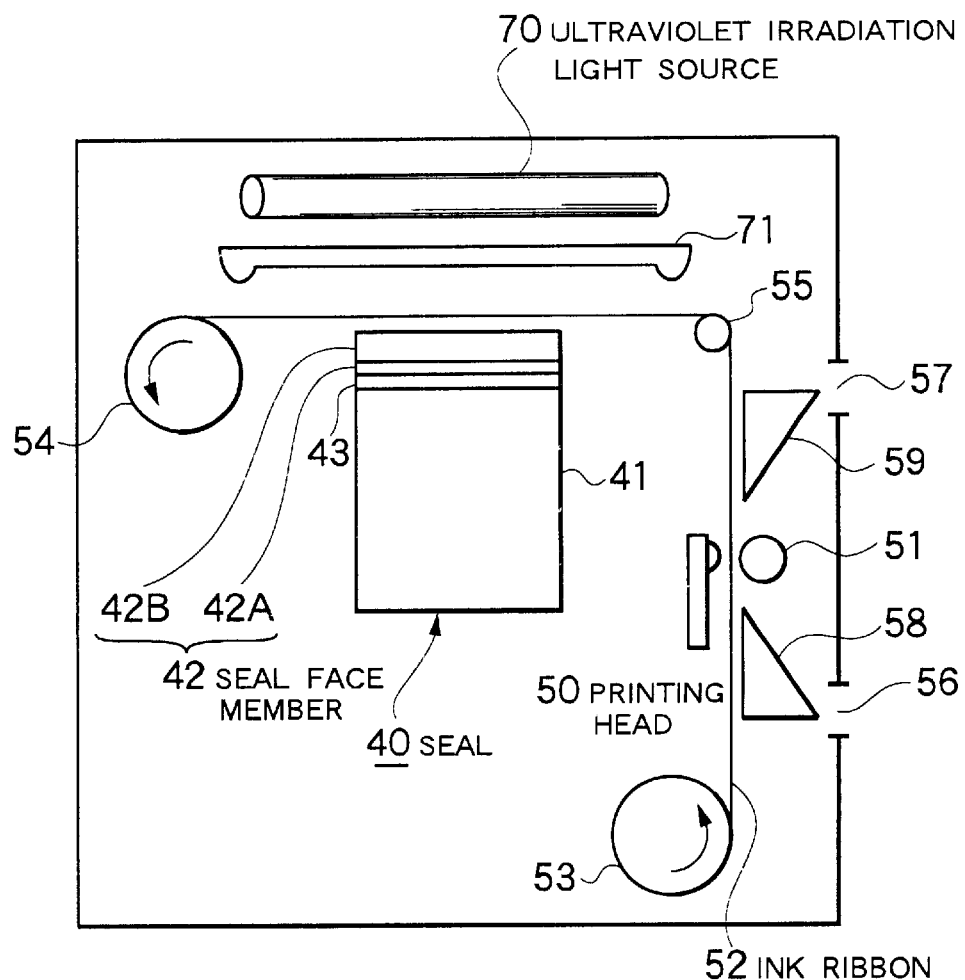
FIG. 3 is a view showing the arrangement of mechanical-optical members according to an embodiment of the present invention.

Hereinafter, embodiments of a seal producing apparatus according to the present invention will be described with reference to the attached drawings.
(A) Constitution of the Embodiment The seal producing apparatus of the present invention roughly includes electrical members (including an information processing unit and an imprint transfer control unit) shown in FIG. 2, and mechanical-optical members (including a printing unit and a light irradiation unit) shown in FIG. 3. FIG. 3 also shows the configuration of a seal itself.

Referring to the block diagram in FIG. 2, the electrical members in this embodiment will be described.

The electrical members are adapted mainly to introduce imprint pattern information so as to control the mechanical-optical members, and categorized into a type of information processor. The electrical members roughly includes an input unit 10, a control unit 20 and an output unit 30, as in the other information processors. The control unit 20 is adapted to execute processing in accordance with information supplied from the input unit 10 and a processing stage at that time, and to control the mechanical-optical members via the output unit 30 based on the result of the processing, etc.

The input unit 10 includes a key input unit 11, a switch 12 for switching the state of the apparatus, and various types of detection sensors 13.

The switch 12 is constituted by, for example, a dial switch, and is adapted to instruct turning-on and turning-off of the electric power, starting exposure to the seal (the seal face member) and opening a cover member provided at a space for accommodating the seal. As the detection sensors, a sensor for detecting attachment of an ink ribbon, and a sensor for detecting attachment and position of plate-making sheet as later described can be mentioned.

The key input unit 11 roughly includes a character key section constituted by a selection dial or character key adapted to generate general operation signals for character input, and a function key section adapted to generate operation signals associated with functions other than character input and specific operation signals for character input, such as deletion of input characters, input of symbol characters, etc. The function key section has a file key associated with a file processing function as later described.

The output unit 30 includes mechanical-optical-member driving circuits 31 for driving and controlling each of the mechanical-optical members as later described, and display driving circuits 32 for driving the display unit 33. The driving circuits 31 and 32 are adapted to drive their associated units under the control of the control unit 20.

The display unit 33 includes a liquid crystal display capable of displaying, for example, six characters, and a plurality of indicators arranged around the liquid crystal display. The liquid crystal display is adapted to display a guidance message for the user, and a character string input by the user. At the portions on the surface of the apparatus associated with the respective indicators, characters representing the attributes or states (for example, character size, character type, etc.) allocated to the respective indicators are printed. The current attributes or states are shown by lighting-on, lighting-off or blinking of the associated indicators.

Note that the mechanical-optical-member driving circuits 31 actually includes various driving circuits, but are shown in a block in the drawing. The mechanical-optical members include various members which must be controlled as described later, and actually driving circuits are provided for the respective members to be controlled.

The control unit 20 is constituted by, for example, a microcomputer. The control unit 20 includes a CPU 21, a ROM 22, a RAM 23, a character generator ROM (CG-ROM) 24, an input interface 25 and an output interface 26 that are connected via system bus 27.

The ROM 22 stores various types of processing programs used for producing a seal to be executed by the CPU 21, including file processing program 22a (see FIG. 1) and seal replacement-time processing program 22b (see FIG. 11), and fixed data, such as dictionary data for kana-kanji conversion. In this embodiment, as one of the fixed data, a file calling condition table 22c (see FIG. 8) is stored.

The RAM 23 is used as a working memory by the CPU 21 and adapted to store fixed data associated with user input. The RAM 23 is backed up even while the electric power is turned off. Note that, although in FIG. 2 the RAM 23 is constituted as an internal RAM, the RAM 23 may be constituted as a combination of such an internal RAM and an add-on RAM. Further, part of functions of the RAM 23 may be served by a rewritable non-volatile memory, such as EEPROM, etc.

In this embodiment, in the RAM 23, there is provided, in addition to a text area 23a and a display buffer 23b, a file area 23c and a file management table 23d.

The CG-ROM 24 is adapted to store dot patterns of the letters and symbols provided in the seal producing apparatus and to output, when code data for specifying a letter or symbol are supplied, dot patterns corresponding thereto.

The input interface 25 is adapted to interface between the input unit 10 and the control unit 20. The output interface 26 is adapted to interface between the output unit 30 and the control unit 20.

The CPU 21 is adapted to execute a processing program stored in the ROM 22 that is determined in accordance with an input signal sent from the input unit 10 and a processing stage at that time while utilizing the RAM 23 as a working area or, if necessary, appropriately using fixed data stored in the ROM 22 or RAM 23. Also, the CPU 21 is adapted to cause the display unit 33 to display the state or the result of the processing, or drives each of the mechanical-optical members (FIG. 3) so as to produce a seal.

Next, the arrangement of the mechanical-optical members and the configuration of the seal will be described with reference to FIG. 3.

The seal 40 includes a base member 41, a sponge member 43 attached on one surface of the base member 41 for enhancing contact between the convex portions of the seal face member and a sheet, and a planar seal face member 42. The seal face member 42 includes a base layer 42A insensitive to ultraviolet light, and an ultraviolet-setting-resin layer 42B exposing to the outside. In the ultraviolet-setting-resin layer 42B, portions other than the set portion can be removed with a specific liquid (for example, water). Note that the seal 40 has a physical identification element, such as a hole, which enables a seal type detection sensor (denoted by reference numeral 13 in FIG. 2) to detect a seal type of the loaded seal.

The mechanical-optical members shown in FIG. 3 roughly include a printing structure and an ultraviolet irradiation structure.

The printing structure employs a thermal transfer method and includes a printing head 50 of a fixed type, a platen roller 51, an ink ribbon 52, a feeding reel 53, a winding reel 54, a roller 55 for switching the proceeding direction of the ink ribbon 52. The printing structure further includes an insertion hole 56 for inserting a plate-making sheet (see FIG. 4), a discharging hole 57 for discharging the plate-making sheet, a guide member 58 for guiding the plate-making sheet inserted from the insertion hole 56 to a printing position, and a separation structure 59 for separating the plate-making sheet from the ink ribbon 52, both fed from the printing position, so as to guide the plate-making sheet thus separated to the discharging hole 57.

Figure 4A:
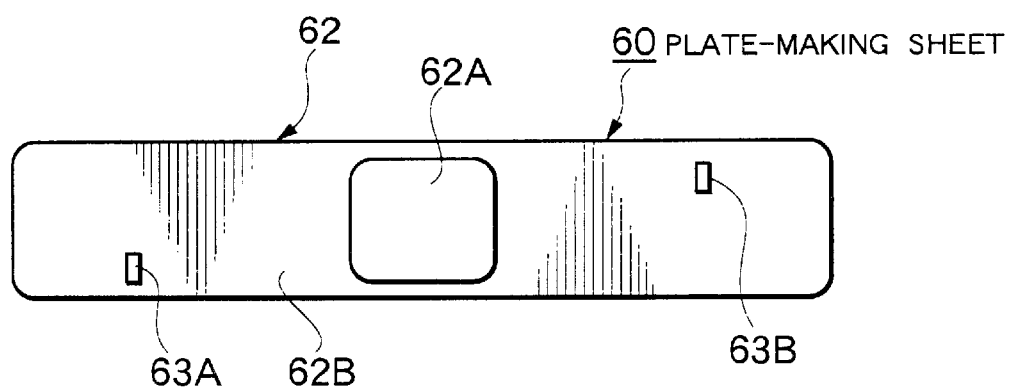
FIGS. 4A and 4B are views showing an arrangement of a plate-making sheet according to an embodiment of the present invention.
Figure 4B:
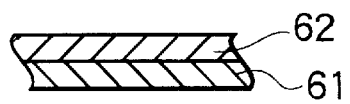

As shown in FIG. 4 illustrating a plate-making sheet 60 used for a rectangular seal, the plate-making sheet 60 includes a sheet body 62 having a rear surface coated with an adhesive agent, and a peelable paper 61 adhered to the rear surface of the sheet body 62. The plate-making sheet 60 has the same size irrespective of seal types of the seal. The sheet 60 has holes 63A and 63B provided symmetrically with respect to the center of the sheet and adapted to indicate a print starting position. The sheet body 62 is divided into a portion 62A having the same shape as the contour of the seal face member, which depends on the seal type of the seal, and a portion 62B other than the portion 62A. Portions 62A and 62B can be separated from each other by half cut, whereby only the portion 62A can be peeled separately. The term "half cut" as used herein refers to the state of the sheet in which only the sheet body 62 is formed with a slit dividing the portion 63A and 63B while the peelable paper 61 is continuous, that is, not formed with such a slit.

When the plate-making sheet 60 is inserted into the insertion hole 56, the edge portion of the plate-making sheet 60 and the ribbon 52 are superposed and placed at the printing position between the printing head 50 and the platen roller 51.

The printing head 50 is adapted to transfer ink of the ink ribbon to the plate-making sheet 60 by generating heat when the heat generation driving circuit (see reference numeral 31 in FIG. 2) is activated under the control of the control unit 20. In the ink ribbon 52 of the thermal transfer method, the transferred portion loses ink and becomes transparent.

That is, the ink ribbon 52 obtained after transferring operation includes a portion which allows ultraviolet light to pass through (a portion from which ink is removed) and a portion which hinders ultraviolet light from passing through (a portion where ink remains). Accordingly, the ink ribbon obtained after the transferring operation, namely, the ink ribbon in which printing of an imprint pattern and consequently transparent portions corresponding to the imprint pattern is formed, is used as a negative film. As described above, the sheet on which printing is executed is used for preparing a negative film, and accordingly the sheet is referred to as "plate-making sheet", and executing printing is referred to as "plate making" in this specification.

In the plate making process, the ink ribbon 52 and the plate-making sheet superposed each other after passing the printing section consisting of the printing head 50 and a platen roller 51 are conveyed by the action of the platen roller 51 to reach the separation structure 59, whereby the ink ribbon 52 and the plate-making sheet 60 are separated.

The separated plate-making sheet 60 is fed to the discharging hole 57. On the other hand, the separated ink ribbon 52 is adapted to stop at the position opposite to the ultraviolet-setting-resin layer 42B of the seal 40. The ink ribbon 52 thus fed during the plate-making operation is adapted to be wound around the winding reel 54.

After the plate-making sheet 60 is discharged from the discharging hole 57, the printed portion 62A thereof is peeled off and attached to the top surface of the seal 40 to help the user recognize the imprint pattern formed on the seal face member of the seal 40.

As the ultraviolet light irradiating structure, an ultraviolet irradiation light source (having, for example, a paraboloidal surface mirror) 70 is fixedly provided. Turning on and off of the light source 70 is controlled by the control unit 20. Also, a transparent plate 71, which is moved forward and backward, is provided opposite to the ultraviolet-setting-resin layer 42B of the seal face member 42 with the ribbon 52 (negative film portion) positioned therebetween. That is, ultraviolet light emitted from the ultraviolet irradiation light source 70 reaches the ultraviolet-setting-resin layer 42B via the transparent plate 71 and the ink ribbon 52.

The transparent plate 71 is adapted to enhance the degree of contact between the ink ribbon 52 serving as a negative film and the ultraviolet-setting-resin layer 42B when situated at the forward movement position (a position taken when the switch 12 designates activation of exposure), and not to obstacle the proceeding of the ink ribbon 52 when situated at the backward position.

Note that the positional relationship between the combination of the ultraviolet irradiation light source 70 and the transparent plate 71 and the seal 40 with the ink ribbon 52 (negative film portion) interposed therebetwen is not limited to that shown in FIG. 3. As another positional relationship, the seal 40 is provided above the ink ribbon 52 while the combination of the ultraviolet irradiation light source 70 and the transparent plate 71 below the ink ribbon 52 with reference to FIG. 3.

(B) General Procedure for Producing Seal According to the Embodiment

Next, a general procedure which is executed by the user for producing a seal with the seal producing apparatus of this embodiment will be described.

The user loads the seal 40 on which no imprint pattern is formed, and then turns on the electric power by operating the switch 12, and then inputs imprint pattern information (a character string) by operating various keys of the key input unit 11. Input of the imprint pattern information includes, as well as input of the character string constituting the imprint image, input of various attributes of the characters, such as styles of the characters, vertical writing vs. lateral writing, and character sizes.

After completing the input of an imprint pattern information, the user executes layout display to verify whether or not the imprint image thus displayed is his desired one. The user, after confirming that the imprint image is his desired one though the layout display, inserts the plate-making sheet 60 into the insertion hole 56 as far as the sheet 60 proceeds. Thereafter, the user executes a plate-making process by operating a plate-making key in the key input unit 11, thereby forming a negative film portion in the ink ribbon 52. When the plate-making key is operated, the CPU 21 develops the input character string on the printing buffer in the RAM 23 in accordance with attributes associated with the character string. Thereafter, the CPU 21 drives the printing head 50 and the platen roller 51 to execute printing so as to prepare a negative film, which is conveyed to the position opposite to the seal face member 42.

After completing the plate-making process, the user instructs exposure by operating the switch 12. In response to this instruction, the CPU 21 activates the ultraviolet irradiation light source 70 to irradiate ultraviolet light onto the seal face member 42. After elapse of a predetermined time of irradiation, the CPU 21 causes an exposure completion message to be displayed and concurrently stops irradiation of the ultraviolet light emitted from the ultraviolet light irradiating source 70. Thereby, in the ultraviolet-setting-resin layer 42B of the seal face member 42, the portions corresponding to the imprint pattern are set.

After completing exposure, the user operates the switch 12 to instruct opening the cover member 65, and takes out the seal 40 obtained after exposure. Thereafter, the user soaks the seal face member 42 of the seal 40 in a specific liquid (for example, water) put in a vessel, the bottom of which is provided with a brush. Then the user moves the seal 40 reciprocatingly to wash the seal face member 42 so as to remove the portion not set, thereby forming unevenness on the seal face member 42, whereby the seal is produced.

(C) File Processing

One of the characteristic features of the seal producing apparatus according to the preferred embodiment of the present invention is a file function. Here, the term "file function" as used herein refers to a function of editing and managing a file containing imprint pattern information. The term "editing a file" means performing registering, calling, deleting, copying, modifying or a like operation with respect to a file. Imprint pattern information contains information of an input character string (often referred to as "imprint pattern information") and information of print attributes (often referred to as "print attribute information") (for example, character size, vertical writing vs. horizontal writing, etc.). Imprint pattern information is input by the user.

Note that no conventional seal producing apparatuses has such a file function. This is probably because the manufacturers of conventional seal producing apparatuses think that, in a case of a seal producing apparatus, once an imprint pattern is engraved on the seal 40, the imprint pattern thus engraved rarely disappears, so that it is not necessary to input the imprint pattern information.

However, in actuality, it often happens that it is necessary to form the same imprint pattern on a plurality of similar seals at the same time at the same place, or at different times at different places. In view of these situations, the file function is provided in the seal producing apparatus according to the present invention.

Figure 1:
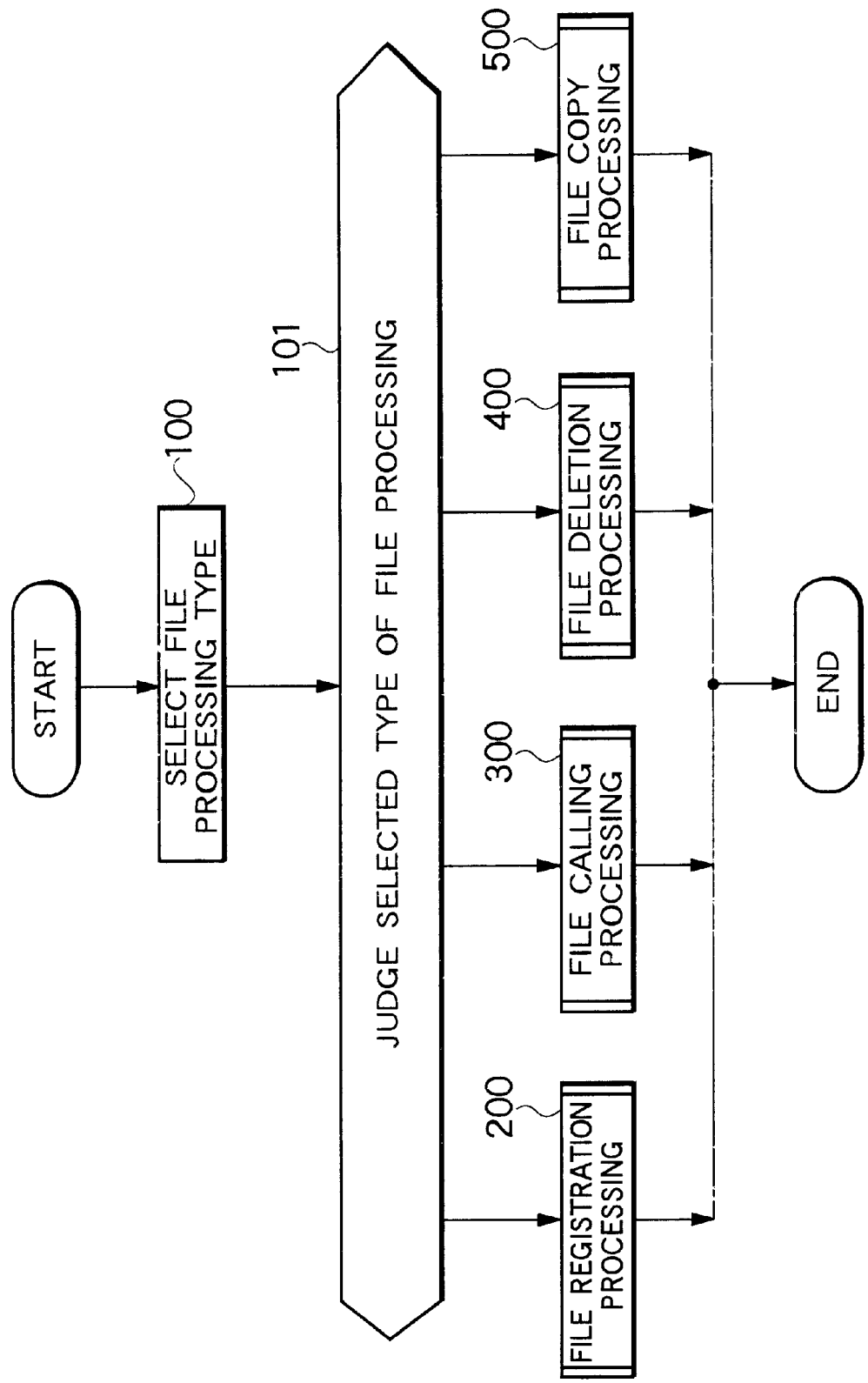
FIG. 1 is a flowchart showing the overall flow of file processing according to an embodiment of the present invention.

FIG. 1 is a flowchart showing the operations of the file processing program 22a by which the file processing is performed. When a file processing mode is designated by operating a file key provided in the key input unit 11 or by selecting the file processing mode from a menu, the CPU 21 starts the operations of the file processing program 22a shown in FIG. 1. Note that, in this embodiment, the operations of the file processing program 22a are started under the condition that the character string input screen is displayed on the display unit 33. That is, only when the character string input screen is displayed, operations of the file processing program 22a can be started.

Also, the CPU 21 urges the user to select a type of file processing, for example, by selecting a desired type from the menu (step 100), and judges the type thus selected (step 101). Note that, in the case of menu selection, the cursor may be initially positioned at the type of the file processing in the menu which was selected last time or at the type of file processing desired by the user.

Figure 5:
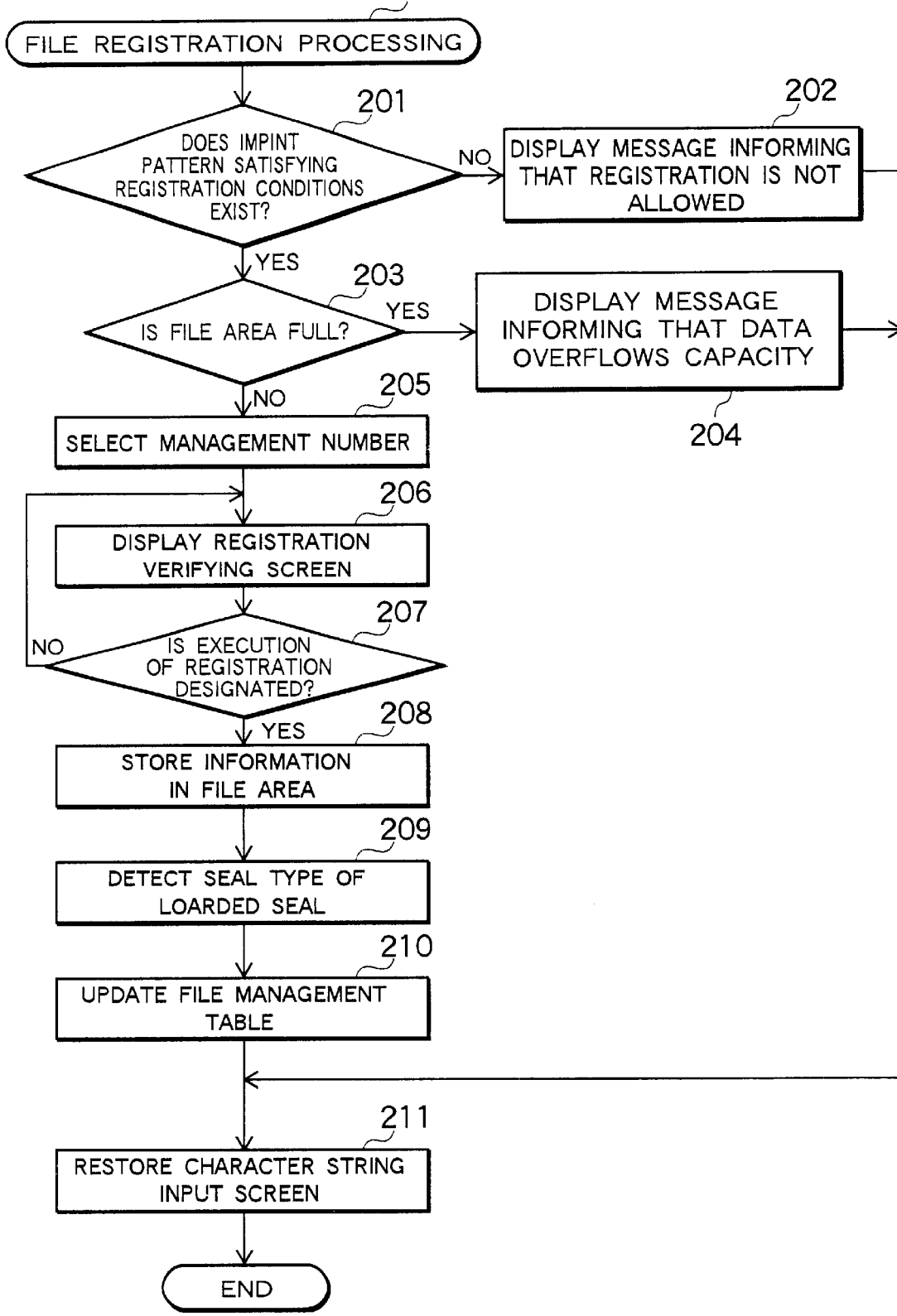
FIG. 5 is a flowchart of an example a flow of file registration processing according to an embodiment of the present invention.

When it is judged at step 101 that processing of registering a file is selected, the CPU 21 performs the processing of registering a file shown in detail in FIG. 5 (step 200). When it is judged at step 101 that processing of calling a file is selected, the CPU 21 performs the processing of calling a file shown in detail in FIG. 7 (step 300). When it is judged at step 101 that processing of deleting a file is selected, the CPU 21 performs the processing of deleting a file shown in detail in FIG. 9 (step 400). When it is judged at step 100 that processing of copying a file is selected, the CPU 21 performs the processing of copying a file shown in detail in FIG. 10 (step 500). Hereinafter, processing of registering a file, processing of calling a file, processing of deleting a file and processing of copying a file will be often referred to as "file registration processing", "file calling processing", "file deletion processing", and "file copying processing", respectively.

(C-1) File Registration Processing

Referring to the flowchart in FIG. 5, concrete processings of registering a file will be detailed hereinafter.

On entering the processings of registering a file, the CPU 21 verifies whether or not an imprint pattern information satisfying registration allowable conditions exists (step 201). Here, the registration allowable conditions include a condition that an input character string exists, and a condition that input character string is constituted by all determined characters. When no input character string exists, or when an input character string exists but the input character string contains an undetermined character, the CPU 21 causes the display unit 33 to display, for a predetermined period of time, a message informing the user that the registration of the input character string is not allowed (step 202). Thereafter, the CPU 21 restores the character string input screen, which was taken before the file processing is started, thus completing the sequence of the processings of registering a file (step 211). Note that the change of display from the message informing that the registration of the input character string is not allowed to the character string input screen may be performed by operating any one of the keys.

When it is judged at step 201 that an input character string consisting of all determined characters exists, the CPU 21 verifies whether or not the maximum number of files are already registered, and whether or not the file area has room (vacant area) for registering the file to be registered (step 203). Verifying whether or not the maximum number of files are already registered is performed on the basis of the registration flag stored in the file management table 23d. Verifying whether or not the file area has room (vacant area) for registering the file to be registered is performed by comparing the total amount of the information related to the file management table 23d and the information of the text area 23a with the capacity of the file area 23c. When it is judged at step 203 that the information intended to be stored at this time cannot be registered as a file, the CPU 21 causes the display unit 33 to display, for a predetermined period of time, a message informing that the information cannot be registered as a file because the information exceeds the allowed capacity (step 204). Thereafter, the CPU 21 restores the character string input screen which was taken before the file processing is started, thus completing the sequence of processings of registering a file (step 211). Note that change of display from the message informing that the registration of the input character sting is not allowed to the character string input screen may be performed by operating any one of the keys.

When it is judged that the information of this time can be stored as a file in the file area 23c, that is, when it is judged at step 203 that file area has room for registering the file of this time, the CPU 21 allows the user to select a management number used for regulating a storage area in which the file will be registered (step 205). In the seal producing apparatus according to this embodiment, the RAM 23 provided in the mainframe of the apparatus is adapted to store 100 address files at its maximum, and the add-on RAM 23 is also adapted to store 100 files at its maximum. Management numbers "00" to "99" are allocated to each of the RAM 23 in the mainframe and the add-on RAM 23 are displayed in the form of an encircled numeric character so as to be distinguished from those allocated to the RAM 23 in the mainframe.

The management number is selected in the following way. The CPU 21 accesses the file management table 23d shown in FIG. 6 to find out the smallest management number out of the management numbers which are not used for registering information yet, and causes the display unit 33 to display the management number thus found as an initial eligible management number. Thereafter, if the next eligible management number is designated by operating, for example, a cursor movement key, the CPU 21 changes the displayed management number from the initial eligible one to the next eligible one. When the displayed management number is selected by operating the selection key, the selected management number is determined as the management number used for regulating the storage area in which the file to be registered thereafter. Hereinafter, the management number used for ruling a file will be often referred to as "file management number".

In addition to the above-mentioned way of selecting a management number, the management number may be selected by inputting a numeral representing the management number. In this case, if an input numeral represents a management number whose associated registration flag is in the off state, the input numeral is accepted as a selected management number. By contrast, if an input numeral represents a management number whose associated registration flag is in the on state, the input numeral is converted to another numeral satisfying two conditions: a first condition that the numeral obtained after conversion represents a management number whose associated registration flag is in the off state, and a second condition that the numeral obtained after conversion is proximate to the management number denoted by the input numeral. Then, the numeral obtained after the conversion is accepted as a selected management number.

Note that, in some cases, the phrase "proximate to" appearing at the previous paragraph is not the same as the phrase "most closely next to". More particularly, under the assumption that an input numeral represents a management number whose associated registration flag is in the on state, if the registration flag associated with the management number most closely next to the management number denoted by input numeral is in the off state, the numeral obtained after conversion is the numeral which represents the management number most closely next to the management number denoted by the input numeral. However, under the same assumption, if the registration flag associated with the management number most closely next to the management number denoted by input numeral is also in the on state but the registration flag associated with the management number second closely next to the management number denoted by input numeral is in the off state, the numeral obtained after conversion is the numeral which represents the management number second closely next to the management number denoted by the input numeral.

The file management table 23d, which is appropriately accessed in the course of the various types of processings related to files, contains a seal type, a registration flag, a head address, a data length and a proximate flag, which are related to each file management number, as shown in FIG. 6.

Note that the state of the contents (i.e. data or information) stored in the file management table 23d is often referred to as "storage state" in the present specification and the appended claims.

The seal type shows information of a seal type of a seal loaded in the apparatus at the time when the file is registered or at a time when a file of copy-destination is stored. The registration flag shows whether or not a file is registered in connection with the management number. The head address shows an address of the file area 23c in which the head data of the file is stored. The data length represents a data length of the file. The storage area of the file area 23c in which the file is stored is specified by the head address and the data length. Note that for one file, a plurality of head addresses and data lengths may be stored, that is, one file may be divided into a plurality of portions when the file is stored. The proximate flag specifies the file which was registered or called last time, that is, at a time immediately before the current time.

After urging the user to select the management number used for registering the seal data as described above, the CPU 21 causes the display unit 33 to display the registration verifying screen (step 206). Thereafter, the CPU 21 awaits instruction of executing the registration of the file while judging which key is operated by the user (step 207). Here, the registration verifying screen consists of a management number displaying portion for displaying a management number in a fixed manner and a character string displaying portion for displaying a part of the input character string. In the registration verifying screen, before the execution key is operated, the input character string can be verified by displaying the input character string in a scrolled manner, for example, through cursor key operations.

The flowchart in FIG. 5 shows that CPU 21 awaits an operation of the execution key in the registration verifying screen (steps 206 and 207). However, the CPU 21 may go from the registration verifying screen back to the previous processing steps, for example, when a cancel key or the like is operated.

When the execution of registration is designated, the CPU 21 causes the imprint pattern information consisting of information of the input character string and information of print attributes related to the character string, which has been stored in the text area 23a, to be stored into a vacant area in the file area 23c (step 208). Note that, in the case of an address seal, a name seal and the like, the character string of the seal is input in accordance with the form input method. Under the form input method, the entire character string is input by first designating items, such as address, person's name, company name, department name, etc. one by one, and then inputting character string portions corresponding thereto each time each item is displayed. The character string input in accordance with the form input method is stored in the file area 23c in this form.

Next, the CPU 21, after detecting the seal type of the loaded seal (step 209), updates the information stored in areas in the file management table 23d associated with selected management number (step 210). Thereafter, the CPU 21 causes the display unit 33 to restore the character string input screen (step 211), thus completing the sequence of the file registration processing.

In the registration processing, update of the file management table 23d is performed in the following way. First, as to the seal type, the information recognized at step 209 is stored. Then, the state of the registration flag of the associated management number is turned into the on state. Thereafter, the head address and data length of the storage area of the file area 23c in which the information of this time is stored at the corresponding area in the file management table 23d. The state of the proximate flag of the associated management number is turned into the on state and the proximate flag having been in the on state is turned into the off state.

(C-2) File Calling Processing

Next, referring to the flowchart in FIG. 7, concrete processings of calling a file will be detailed hereinafter.

On entering the file calling processing, the CPU 21 first accesses the file management table 23d at the registration flags therein to judge whether or not a file having been already registered exits in the table 23d (step 301).

When it is judged at step 301 that no file having been already registered exists in the table 23d, the CPU 21 causes the display unit 33 to display, for a predetermined period of time, a message informing the user that no registered file exits (step 302). Thereafter, the CPU 21 causes the display unit 33 to restore the character string input screen (step 303), thus completing the sequence of processings of calling a file. Note that the change of display from the message informing that no registered file exits to the character string input screen may be performed by operating any one of the keys.

By contrast, when it is judged at step 301 that a file having been registered exists in the table 23d, a file to be called is selected.

In this embodiment, selecting a file to be called is performed through two stages: first by judging whether or not the seal type to which the file to be called belongs is allowable in relation to the seal type of the loaded seal; and then by specifying the file to be called.

The reason for providing the stage of judging whether or not the seal type associated with the file to be called is allowable is that the size and shape of the seal face members differ according to seal types, so that the allowable number of lines and the allowable number of characters per line are determined in relation to the seal type.

The stage of judging whether or not the seal type associated with the file to be called is allowable is performed in the following way. Specifically, after it is judged at step 301 that a file having been registered exists in the table 23d, the CPU 21 detects the seal type of the loaded seal and causes the display unit 33 to display the seal type thus detected (step 304). Thereafter, the CPU 21 urges the user to select the seal type associated with a file to be called (step 305). In the processing of urging the user to select a file to be called, the CPU 21 shows the user the seal type of the loaded seal as an initial eligible seal type to be selected. If the initial eligible seal type thus shown is not the seal type associated with the file to be called, the eligible file is altered. It is preferred that alteration of an eligible seal type is performed among the seal types each having a registered file.

After the seal type is selected, the CPU 21 judges, on the basis of the file calling condition table 22c shown in FIG. 8, whether or not the selected seal type is allowed one in relation to the seal type of the loaded seal (that is, whether or not the following calling conditions are satisfied) (step 306).

Here, calling conditions are described below.

The seal types which the apparatus deals with is described. In the present embodiment, as shown in FIG. 8, the seal types which the apparatus deals with are "private seal (small size)", "private seal", "rectangular seal (small size)", "rectangular seal (medium size)", "accounting seal", "name seal", "business seal (small size)", "business seal (large size)" and "address seal".

Of the above-mentioned seal types, "private seal (small size), "private seal", "rectangular seal (small size)", "rectangular seal (medium size)" are common in that the lengthwise and widthwise dimensions of the contour (areas) of each seal face member for containing the input character string (lines of input characters) are almost the same. The difference between these seal types lies in that the former two seal types are almost circular-shaped and the latter two seal types are almost square-shaped. With respect to the size of the seal face member, these seal types are put in the smaller-to-large order of "private seal (small size)", "private seal", "rectangular seal (small size)" and "rectangular seal (medium size)". Hereinafter, these seal types are categorized as "square-shaped seal-type group".

By contrast, "accounting seal", "name seal", "business seal (small size)", "business seal (large size)" and "address seal" are common in that the contour (area) of each seal face member for containing the input character string (lines of input characters) has an oblong or elongated rectangular shape in which one of the lengthwise and widthwise dimensions is considerably larger than the other. With respect to the size of the seal face member, these seal types are punt in the smaller-to-larger order of "accounting seal", "name seal", "business seal (small size)", "business seal (large size)", and "address seal". Hereinafter, these seal types are categorized as "elongated rectangular-shaped seal-type group" or "rectangular-shaped seal type group".

As to these seal types, whether calling a file is allowed or not is judged in the following way. Specifically, as shown in FIG. 8, when a seal belonging to the "rectangular-shaped seal-type group" is loaded in the apparatus, calling a file associated with a seal belonging to the "square-shaped seal-type group" is not allowed (Note that, in the table 22b of FIG. 8, the symbol "Y" shows that calling a file is allowed, while the symbol "N" shows that calling a file is not allowed.). Also, when a seal belonging to the "square-shaped seal-type group" is loaded in the apparatus, calling a file associated with a seal belonging to the "rectangular-shaped seal-type group" is not allowed. Thus, calling a file is allowed only when the seal type of the loaded seal and the seal type associated with a file to be called belong to the same category.

Between two different seals under the same category, that is, between two different seals both belonging to the "square-shaped seal-type group" or between two seals both belonging to the "rectangular-shaped seal-type group", calling a file is allowed only when size of the seal type of the loaded seal is equal to or larger than that of the seal type associated with a file to be called.

Since the above-mentioned calling conditions are provided, the calling of a file which does not satisfy the allowable values of the line number and the character number per line of the seal type of the loaded seal is prohibited.

Under the above-mentioned calling conditions, when a negative judgment is made at step 306, that is, when it is judged at step 306 that the seal type associated with the file to be called is not allowed one in relation to the seal type of the loaded seal, the CPU 21 causes the display unit 33 to display, for predetermined period of time, a message informing the user that the selected seal type is not an allowed one (step 307). Thereafter, the CPU 21 restores the character string input screen (step 303), thus completing the sequence of processings of calling a file.

Note that the change of display from the message informing that the selected seal type is not allowed one to the character string input screen may be performed by operating any one of the keys. Further, after completing the processing at step 307, where the CPU 21 causes the display unit 33 to display the message informing the selected seal type is not allowed one, the CPU 21 may return to step 305, where the seal type associated with the file to be called is selected.

By contrast, when a positive judgment is made at step 306, that is, when it is judged at step 306 that the seal type associated with the file to be called is allowed one in relation to the seal type of the loaded seal, the CPU 21 accesses the file management table 23d at the registration flag and seal type therein to judge whether or not a registered file exists as to the selected seal type (step 308).

When it is judged at step 308 that no registered file exists as to the selected seal type, the CPU 21 causes the display unit 33 to display, for predetermined period of time, a message informing the user that no registered file exists (step 309). Thereafter, the CPU 21 restores the character string input screen (step 303), thus completing the sequence of processings of calling a file.

Note that the change of display from the message informing that no registered file exists to the character string input screen may be performed by operating any one of the keys. Also, after step 309, where the CPU 21 causes the display unit 33 to display, for a predetermined period of time, the message informing that no registered file exists, the CPU 21 may return to step 305, where the seal type associated with the file to be called is selected.

By contrast, when it is judged at step 308 that at least one registered file exists as to the selected seal type, the CPU 21 urges the user to select a file to be called by selecting amanagement number (step 310). Urging the user to select a management number is performed in the following way. Specifically, if a registered file whose proximate flag is in the on state exists among the registered files associated with the selected seal type, the file denoted by the management number of the registered file whose proximate flag is in the on state is displayed as an initial eligible file. By contrast, if no registered file whose proximate flag is in the on state exists among the registered files associated with the selected seal type, or if the initial eligible file thus displayed is not the file to be called, the other registered files are displayed one by one as the other eligible files in the smaller-to-larger order of their management numbers. Note that the management number may be selected by inputting a numeral representing the management number of the file to be called.

After the processing of selecting a file is completed, the CPU 21 reads, from the file area 23c, the contents of the selected file (that is, the data denoted by the associated management number) and stores the read contents in the display buffer 23b so as to cause the display unit 33 to display a file content verifying screen (step 311). Note that, at this time, the input character string stored in the text area 23a is maintained as it is. Then, the CPU 21 awaits an instruction of executing the calling of the file (step 312).

Here, the file content verifying screen consists of a management number displaying portion for fixedly displaying a management number and a character string display portion for displaying a part of the character string stored in the selected file. In the file content verifying screen, before executing the calling of the selected file, the character string of the selected file can be verified by displaying in a scrolled manner the character string appearing at the character string display portion by operating a cursor key or the like.

The flowchart in FIG. 7 illustrates that the file content verifying screen awaits the execution of the calling operation (steps 311 and 312). However, the processing may go from the file content verifying screen back to the previous processing steps when a cancel key or the like is operated.

After the file content verification processing is completed, the CPU 21 reads the contents of the selected file out of the file area 23c and overwrites the read contents onto the text area 23a. Concurrently, the CPU 21 causes the display unit 33 to display the contents thus read at the ordinary character string input screen, and turns the state of the proximate flag of the management number associated with the selected file into the on state and turns the state of the proximate flag of the other management number having been in the on state into the off state, thus completing the sequence of processings of calling a file (step 313).

Note that, as a result of the overwriting performed on the text area 23a, the input character string having existed before the designation of the file processing is erased.

Further, when the contents having been stored in the file area 23c is overwritten on the text area 23a, a part of the print attributes may be converted appropriately.

More particularly, assume cases where types of outer frames or character enclosing patterns differ depending on seal types. For example, if the outer frame type stored in the file area 23c cannot be used for the seal pattern of the loaded seal, the outer frame type may be automatically converted on the basis of a outer frame conversion table (not shown) so as to be suited for the seal type of the loaded seal.

Further, for example, in the case where the seal producing apparatus is of the type in which a character size is designated by an absolute value, the character size of the stored content may be automatically converted into a character size suitable for the seal type of the loaded seal. Note that, if the apparatus is of the type in which character size is designated by a relative value, such as "large", "medium" and "small", such a conversion is not needed. In this respect, it is preferred to designate a character size by a relative value.

(C-3) File Deletion Processing

Figure 9:
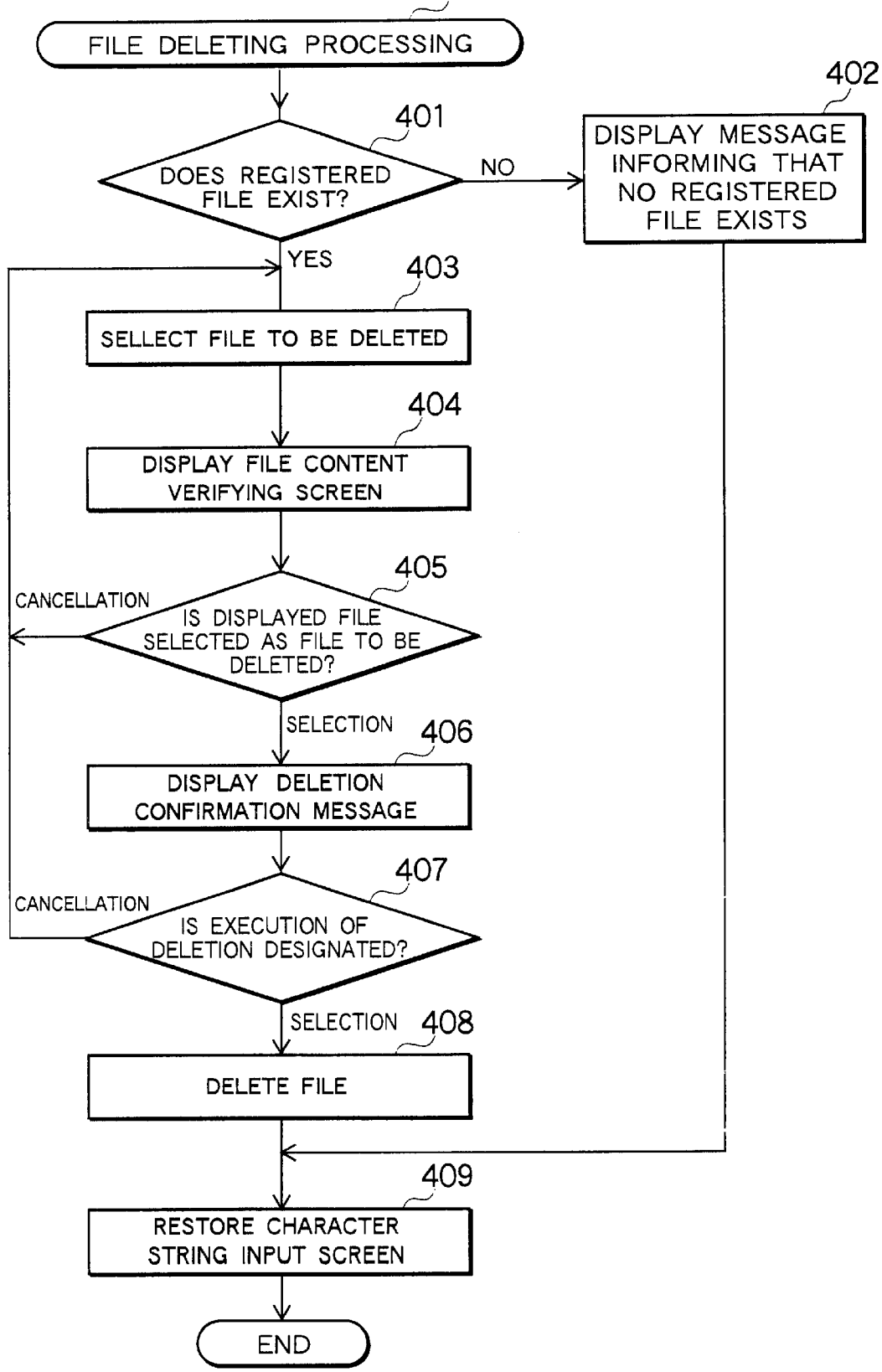
FIG. 9 is a flowchart showing an example of a flow of file deletion processing according to an embodiment of the present invention.

Referring to the flowchart shown in FIG. 9, concrete processings of deleting the file will be described hereinafter.

On entering the processing of deleting the file, the CPU 21 first accesses the file management table 23d at the registration flags therein to judge whether or not a file having been already registered exists in the table 23d (step 401).

When it is judged at step 401 that no file having been already registered exists in the table 23d, the CPU 21 causes the display unit 33 to display, for a predetermined period of time, a message informing the user that no registered file exists (step 402). Thereafter, the CPU 21 causes the display unit 33 to restore the character string input screen (step 409), thus completing the sequence of processings of deleting a file. Note that the change of display from the message informing that no registered file exists to the character string input screen may be performed by operating any one of the keys.

By contrast, when it is judged at step 401 that a file having been registered exists in the table 23d, a file to be deleted is selected in the following way. Specifically, after it is judged at step 401 that a file having been registered exists in the table 23d, the CPU 21 urges the user to select a file to be deleted (step 403). In the processing of urging the user to select a file to be deleted, the CPU 21 shows the user the registered files (that is, files whose registration flag is in the on state) as eligible files for selection one by one in the smaller-to-larger order of the management numbers. Showing the registered files is conducted regardless of whether or not the proximate flags of the registered files are in the on state. Alternatively, selecting the file to be deleted may be performed by inputting a numeral representing the management number. Further, selecting the file to be deleted is performed by first selecting a seal type having registered files, and then selecting one file out of registered files belonging the seal type.

After the processing of selecting a file is completed, the CPU 21 reads, from the file area 23c, the contents of the selected file, that is, the data denoted by the associated management number and stores the read contents together with the associated management number in the display buffer 23b so as to cause the display unit 33 to display a file content verifying screen (step 404). Note that, at this time, the input character string stored in the text area 23a is maintained as it is. Thereafter, the CPU 21 judges whether or not, in response to the display on the file content verifying screen, the user selects the displayed file as the file to be deleted by operating the selection key or the cancel key (step 405).

As in the case of the calling processing, the file content verifying screen consists of a management number displaying portion for fixedly displaying a management number and a character string display portion for displaying a part of the called character string. In the file content verifying screen, before executing or canceling deletion of the selected file, the character string of the selected file can be verified by displaying in a scrolled manner the character string appearing at the character string display portion by operating a cursor key or the like.

When it is judged at step 405 that cancellation of deletion is designated, the CPU 21 returns to step 403 to urge the user to newly select the file to be deleted.

By contrast, when it is judged at step 405 that the selection of deletion is designated, the CPU 21 causes the display unit 33 to display a deletion confirmation message 33 (step 406), and judges whether or not the user has designated executing (selecting) the deletion of the file in response to the message thus displayed (step 407). When it is judged at step 407 that canceling the deletion of the file is designated, the CPU 21 returns to step 403 to urge the user to newly select a file to be deleted.

When it is judged at step 407 that executing the deletion of the file is designated, the CPU 21 deletes the selected file, that is, deletes the contents denoted by the associated management number (step 408). Thereafter, the CPU 21 causes the display 35 to restore display of the character string input screen (step 409), thus completing the sequence of the processings of deleting the file.

The processings of deleting the file may be performed either by taking an action only on the file management table 23d or by taking actions both on the file management table 23d and on the storage area of the file area 23c in which the selected file is stored. In the former case, the states of the registration flag and proximate flag are turned into the off state, and the states of the seal type, the head address and the data length are all turned into 0 or all turned into 1. In the latter case, in addition to these actions applied on the file management table 23d, the CPU 21 executes an action of erasing the storage area of the file area 23c in which the selected file (that is, the contents associated with the selected management number) has been stored by turning the states of the storage area into all 0 or all 1.

(C-4) File Copying Processing

Next, referring to the flowchart shown in FIG. 10, concrete processings of copying a file will be detailed hereinafter.

On entering the processings of copying a file, the CPU 21 first accesses the file management table 23d to judge whether or not a file having been already registered exists in the table 23d (step 501).

Here, the terms "file of copy original" and "file of copy destination" used in the following paragraphs have the following meanings. Assuming that a "file A" stored in the area denoted by the management number "00" copied as a "file B" at the area denoted by the management number "99", the "file A" is referred to as "file of copy original" while the "file B" is referred to as "file of copy destination". The contents (i.e. data) of the "file A" and "file B" are the same. In the embodiment of the present invention, each of the files is identified by its associated management number, that is, the files are not labeled under such names "file A" and "file B". Therefore, the labeling of "file A" and "file B" appearing in this paragraph is employed only for explaining the meanings of the terms "file of copy original" and "file of copy destination".

When it is judged at step 501 that no file having been already registered exists in the table 23d, the CPU 21 causes the display unit 33 to display, for a predetermined period of time, a message informing the user that no registered file exists (step 502). Thereafter, the CPU 21 causes the display unit 33 to restore the character string input screen (step 512), which was taken before entering the file processing, thus completing the sequence of processings of copying a file. Note that the change of display from the message informing that no registered file exists to the character string input screen may be performed by operating any one of the keys.

When it is judged at step 501 that a file having been registered exists in the table 23d, the CPU 21 urges the user to select a file whose registration flag is in the on state (step 503) as a file of copy original. In the processing of urging the user to select a file of copy original, the CPU 21 shows the user registered files (that is, files whose registration flag is in the on state) as eligible files of copy original for selection one by one in the smaller-to-larger order of the management numbers. Showing the registered files is conducted regardless of whether or not the proximate flags of the registered files are in the on state. Alternatively, selecting the file of copy original is performed by inputting a numeral representing the management number.

When a file is designated as a file of copy original, the CPU 21 judges whether or not the file of copy original can be stored, that is, whether or not the maximum number of files are already registered, and whether or not the file area has room (vacant area) for storing the file of copy destination (step 504). Judging whether or not the maximum number of files are already registered is performed by checking whether or not all the registration flags in the file management table 23d are in the on state. Judging whether or not the file area has room (vacant area) for storing the file of copy destination is performed by comparing the total amount of the information related to the file management table 23d and the information of the file of copy original with the capacity of the file area 23c.

When it is judged at step 504 that the file of copy destination cannot be stored, the CPU 21 causes the display unit 33 to display, for a predetermined period of time, a message informing the user that the copying cannot be executed because the information exceeds the allowed capacity of the area (step 505). Thereafter, the CPU 21 causes the display unit 33 to restores the character string input screen, which was taken before the file processing is started, thus completing the sequence of the processings of copying a file (step 512). Note that the change of display from the message informing that the copying cannot be performed to the character string input screen may be performed by operating any one of the keys.

When it is judged at step 504 that the file of copy original can be stored, the CPU 21 reads, from the file area 23c, the contents of the selected file, that is, the data denoted by the associated management number and stores the read contents together with the associated management number in the display buffer 23b so as to cause the display unit 33 to display a file content verifying screen (step 506). Note that, at this time, the input character string stored in the text area 23a is maintained as it is. Thereafter, the CPU 21 judges whether or not, in response to the display on the file content verifying screen, the user selects the displayed file as the file of copy original by operating the selection key or the cancel key (step 507).

As in the case of the calling processing, the file content verifying screen consists of a management number displaying portion for fixedly displaying a management number and a character string display portion for displaying a part of the called character string. In the file content verifying screen, before executing or canceling the copying of the selected file, the character string of the selected file can be verified by displaying in a scrolled manner the character string appearing at the character string display portion by operating a cursor key or the like.

When it is judged at step 507 that cancellation of copying is designated by operating a cancel key, the CPU 21 returns to step 503 to urge the user to newly select the file of copy original.

By contrast, when it is judged at step 507 that selection of copying is designated by operating a selection key, the CPU 21 urges the user to select a management number from the files whose registration flag is in the off state to denote an area of copy destination for storing the file of copy destination (step 508). Urging the user to select the management number denoting the area of copy destination is performed by showing the user the management numbers whose registration flag is in the off state as eligible management numbers for selection one by one in the smaller-to-larger order of the management numbers. Alternatively, selecting the management number may be performed by inputting a numeral representing the management number.

After a management number for a file of copy destination is selected, the CPU 21 causes the display unit 33 to display a copy confirmation message 33 (step 509), and judges whether or not the user has designated execution of the copying of the file in response to the message thus displayed (step 510). When it is judged at step 510 that cancellation of the copying is designated, the CPU 21 returns to step 508 to urge the user to newly select a management number of copy destination.

By contrast, when it is judged at step 510 that execution of copying is designated by operating the selection key, the CPU 21 copies the contents of the selected file of copy original (that is, the data in the area denoted by the associated management number) to the area denoted by the management number selected for the copy destination (step 511). Thereafter, the CPU 21 causes the display 35 to restore the character string input screen (step 512), thus completing the sequence of the processings of copying a file.

Updating the file management table 23d, which is a part of the copy processing performed at step 511, is performed in the following way. First, as to the seal type, the data in the area of copy original is stored as it is in the area denoted by the management number of copy destination. Then, the state of the registration flag copy destination is turned into the on state. Then, the head address and the data length of the storage area of the file area 23c in which the copied file is stored are stored as the data of the file of copy destination. Finally, the state of the proximate flag denoted by the management number of copy destination is turned into the on state. As to the file of copy original, the only operation performed is turning, if the state of the proximate flag is in the on state, the state of the proximate flag from the on state to the off state. Thus, as to the file of copy original, no data except for the proximate flag is updated.

(D) Seal Replacement-time Processing

As another characteristic feature of the seal producing apparatus of the embodiment of the present invention, processing performed at the time when the seal is replaced under the state that the input character string exists. In the following descriptions, the processing performed at the time when the seal is replaced under the state that the input character string exists (which is often referred to as "seal replacement-time processing") will be described with reference to the flowchart in FIG. 11. Note that the information of the seal type of the loaded seal is stored in the RAM 23 in a non-volatile manner. Also, note that replacement of the seal loaded in the apparatus is performed while the electric power of the apparatus is being turned off and that, even while the electric power is being turned off, the backup electric power operates to maintain the information of the seal type of the seal which has been loaded in the apparatus till the replacement.

After the electric power is turned off under the state that the input character string exists, the seal loaded in the apparatus is replaced with another seal. After the replacement of seal loaded in the apparatus is completed, the electric power is turned on again, whereby the CPU 21 initiates the seal replacement-time program 22b shown in FIG. 11. Note that various programs are executed at the time when the electric power is turned on and that, if the input character string exists at the time when the electric power is turned on again, the seal replacement-time program 22b in FIG. 11 is also executed together with such various programs.

On entering the seal replacement-time processing, the CPU 21 compares the seal type of the seal newly loaded in the apparatus which is detected by the seal type detection sensor (the seal type newly loaded is often referred to as "seal type after the replacement") with the seal type before the replacement having been stored in the RAM 23 (often referred to as "seal type before the replacement") so as to judge whether or not the seal type before the replacement is the same as the seal type after the replacement (step 600).

When it is judged at step 600 that the seal types before and after the replacement are the same, the CPU 21 completes the sequence of the seal replacement-time processing. In this case, since no access is made to the text area 23a and the display buffer 23b, the character string input mode which has been taken so far is maintained.

By contrast, when it is judged at step 600 that the seal types before and after the replacement are not the same, the CPU 21 judges whether or not the seal type after the replacement satisfies conditions that the shape of the seal type after the replacement is substantially similar to that of the seal type before the replacement and that the size of the seal type after the replacement is larger than that of the seal type before the replacement (step 601).

This judgment is made while using, for example, the file calling condition table 22b in FIG. 8. When FIG. 8 is employed for this judgement, the item "seal type of the file to be called" deemed to be an item "seal type before the replacement" while the item "the seal type of the loaded seal" is deemed to be an item "seal type after replacement". When the blank positioned at the intersection of the seal type under the item "seal type before the replacement" and the seal type under the item "seal type after replacement" is filled with "Y", the newly loaded seal is judged to satisfy the conditions that the shape of the seal type after the replacement is substantially similar to that of the seal type before the replacement and that the size of the seal type after the replacement is larger than that of the seal type before the replacement.

When a negative result obtained in the judgment at step 601, that is, when it is judged at step 601 that the seal type after the replacement satisfies neither the condition that the shape of the seal type after the replacement is substantially similar to that of the seal type before the replacement nor the condition that the size of the seal type after the replacement is larger than that of the seal type before the replacement, the CPU 21 clears the text area 23a and the character string in the display buffer 23b (step 602). That is, the input character string is completely erased so as to bring about the state in which input of character string can be tried again from the beginning.

After completing the processing at step 602, or when it is judged at step 601 that the seal type after the replacement satisfies conditions that the shape of the seal type after the replacement is substantially similar to that of the seal type before the replacement and that the size of the seal type after the replacement is larger than that of the seal type before the replacement, the CPU 21 updates the information of the seal type from the information of the seal type before the replacement to the information of the seal type after the replacement (step 603), thus completing the sequence of the seal replacement-time processing. Note that, if the apparatus is of the type that the character attributes, such as character size, is designated in the form of an absolute value, the character attributes, as well as the seal type, are updated so as to conform to the newly loaded seal type.

When a positive result obtained in the judgment at step 601, that is, when it is judged at step 601 that the seal type after the replacement satisfies conditions that the shape of the seal type after the replacement is substantially similar to that of the seal type before the replacement and that the size of the seal type after the replacement is larger than that of the seal type before the replacement, no access is made to the text area 23a and the display buffer 23b, so that the character string input state so far is maintained.

(E) Advantage of the Embodiment

According to the seal producing apparatus according to the above-mentioned embodiment, the file function is provided for the imprint pattern information including input character string information and print attribute information. Owing to this constitution, even when the allowable values of the line number and character number per line differ depending on the seal types, all or a part of the character string input associated with a seal type can be reused as the character string for another seal type according to necessity.

Here, the seal producing apparatus is configured in such a manner that, when a file is intended to be called, calling of the file is allowed only when the file satisfies the conditions that the shape of the seal type at the time of calling is substantially similar to that of the seal type at the time of registration and that the size of the seal type at the time of calling is equal to or larger than that of the seal type at the time of registration. Owing to this constitution, when a file is called, allowable values of the line number or character number per line which is determined by the seal type of the loaded seal can be satisfied.

Further, according to the seal producing apparatus according to the embodiment of the present invention, under the situation where the seal type is replaced, when the seal type after the replacement satisfies the conditions that the shape of the seal type after the replacement is substantially similar to that of the seal type before the replacement and that the size of the seal type after the replacement is equal to or larger than that of the seal type before the replacement, the character string input state is maintained. Owing to this constitution, all or a part of the input character string input associated with a seal type can be reused as the character string for another seal type according to necessity. In this case as well, the allowable values of the line number or character number per line determined by the seal type after replacement can be satisfied.

In particular, in a case where the character size is designated in a relative value, the above-mentioned file function and replacement-time processing function help the user to easily produce a plurality of seals which are similar to one another.

(F) Other Embodiments

While, in the above descriptions, the alterations or modifications of the above-described embodiment and the other embodiments are occasionally mentioned, further embodiments can be mentioned as described below.

As to the editing types as to the file function, registration, calling, deletion and copying are provided in the above-mentioned embodiment. However, the other editing types may be added, or alternatively some of the editing type may be omitted.

As one of the other editing types to be added, modifying processing, by which the contents of the file is modified, can be mentioned. In the above-mentioned embodiment, modifying is not provided as the editing type. This is because the present inventor thinks that, in view of the fact that the resultant produced by a seal producing apparatus is a seal which rarely requires alteration of the character string therein, the user rarely wishes to modify only the contents of the file. Nevertheless, it is possible to provide such modifying processing. Note that processing equivalent to the modifying processing can be realized by combining the calling processing, deleting processing, and registration processing employed in the above-mentioned embodiment of the present invention. More particularly, the modifying processing can be realized by calling a file from an area denoted by a management number, deleting the file denoted by the management number, altering the character string contained in the file thus called, and registering the file thus altered to the area denoted by the management associated with the deleted file.

An editing type which can be omitted is the copying processing. Note that processing equivalent to copying processing can be realized by the combination of calling and registration even in the above-mentioned preferred embodiment.

Further, although, in the above-mentioned preferred embodiment, the information of the seal type of the loaded seal is not reflected at the time of copying, the information of the seal type of the loaded seal may be reflected at the time of copying. More particularly, copying a file is allowed only when the conditions set forth in the calling condition table 22b are satisfied while deeming the items "seal type associated with the file to be called" and "seal type of the loaded seal" in the file calling condition table 22b in FIG. 8 to be the items "file of copy original" and "file of copy destination" at the time of copying, respectively. That is, while deeming the seal type of the copy destination to be the seal type of the loaded seal, copying a file is allowed only when the seal type of the loaded seal satisfy the conditions that the shape of the seal type of the loaded seal is substantially similar to that of the seal type associated with the file of copy original and that the size of the seal type of the loaded seal is equal to or larger than that of the seal type associated with the file of copy original.

Further, although the calling conditions are conditions that the shape of the seal type of the loaded seal is substantially similar to that of the seal type associated with the file to be called and that the size of the seal type of the loaded seal is equal to or larger than that of the seal type associated with the file to be called in the above-described preferred embodiment, the other calling conditions can be set. For example, assume a case where the first condition that the shape of the seal type of the loaded seal is substantially similar to that of the seal type associated with the file to be called is satisfied, but the second condition that the size of the seal type of the loaded seal is equal to or larger than that of the seal type associated with the file to be called is not satisfied, that is, the size of the seal type of the loaded seal is smaller than that of the seal type associated with the file to be called. Even in the case, if the line number and the character number per line of the character string of the file to be called satisfies the allowable values in the seal type of the loaded seal, calling a file may be allowed. Similarly, the conditions for judging whether or not the character string should be all erased at the time when the seal is replaced may be set in this way.

Further, in the above-mentioned embodiment, the number of the registered file is independent of the seal types. However, a maximum allowable number for file registration may be set with respect to the respective seal types or the respective groups of the seal types (i.e., "square-shaped seal-type group", "rectangular-shaped seal-type group", etc.).

Further, the arrangement of the file management table is not limited to that in the above-mentioned preferred embodiment. While, in the above-mentioned preferred embodiment, an area containing data is identified by the items "head address" and "data length", the area containing data may be identified by "head address" and "tail address". Further, the file management table may contain other items, such as "file name" and "frequency of calling".

Further, while the seal is of the type that the imprint pattern is shaped by the unevenness formed on the surface of the seal face member in the above-described preferred embodiment, the present invention can be applied to a seal of a type that perforation printing method in which ink oozed out of numerous perforations (small pores) arranged in the form of an imprint pattern forms the imprint pattern on a sheet.

(D) Advantages of the Invention

As described above, according to the seal producing apparatus of the first aspect of the present invention, since file storage means for storing, as a file, imprint information including information of a character string and information of a print attribute, a file management table which stores information used for managing storage state at the file storage means, the information stored in the file management table including information of seal type, and file editing/managing means for managing and editing the file stored in the file storage means by using the information stored in the file management table are provided. Owing to this constitution, the file function produced by these means enables the user to reuse all or a part of an input character string of a seal type as a character string for another character string, according to necessity.

Further, according to the seal producing apparatus of a second aspect of the present invention, since loaded-seal replacement detection means for detecting that a seal loaded in the seal producing apparatus is replaced in a character string input state, and character string maintenance/deletion control means which maintains an input character string held before the replacement of the loaded seal when the seal types before and after the replacement of the loaded seal are the same or have a predetermined relationship, but deletes the input character string held before the replacement of the loaded seal when the seal types before and after the replacement of the loaded seal neither are the same nor have a predetermined relationship are provided, all or a part of an input character string of a seal type can be used as a character string for another character string, according to necessity.

It should be noted that, since the present invention is not limited to the above-described embodiments and modifications, the scope of the invention is to be determined solely by the appended claims.

What is claimed is:

1. A seal producing apparatus in which an imprint pattern according to an input character string is formed on a seal face member of a seal, said seal producing apparatus comprising:

file storage means for storing, as a file, imprint information including information of a character string and information of a print attribute;

a file management table which stores information used for managing storage state at the file storage means, the information stored in the file management table including information of seal type; and file editing/managing means for managing and editing the file stored in the file storage means by using the information stored in the file management table;

said file editing/managing means having at least a registration portion for registering a file and a calling portion for calling a file;

said calling portion permitting calling of a file only when a predetermined relationship is established between a seal type of a seal loaded in the seal producing apparatus and a seal type associated with a file to be called;

said predetermined relationship being that the seal loaded in the seal producing apparatus is a seal type having a shape and size suitable to contain the allowable number of lines and the allowable number of characters per line in the seal type associated with the file to be called and that the size of the seal type of the seal loaded in the seal producing apparatus is equal to or larger than the size of the seal type associated with the file to be called.

2. A seal producing apparatus as claimed in claim 1 wherein the seal types are categorized by their character string receiving area into a square-shaped seal-type group and an elongated-rectangular-shaped seal-type group and said calling portion permits calling of a file associated with a seal type in the square-shaped seal-type group only when the seal type of the seal loaded in the seal producing apparatus is in the square-shaped seal-type group.

3. A seal producing apparatus as claimed in claim 2 wherein the square-shaped seal-type group includes circular-shaped seals and square-shaped seals.

4. A seal producing apparatus as claimed in claim 1 wherein the seal types are categorized by their character string receiving area into a square-shaped seal-type group and an elongated-rectangular-shaped seal-type group and said calling portion permits calling of a file associated with a seal type in the elongated rectangular-shaped seal-type group only when the seal type of the seal loaded in the seal producing apparatus is in the elongated rectangular-shaped seal-type group.

5. A seal producing apparatus as claimed in claim 1 wherein the seal types are categorized by their character string receiving area into a square-shaped seal-type group and a elongated-rectangular-shaped seal-type group, said calling portion permits calling of a file associated with a seal type in the square-shaped seal-type group only when the seal type of the seal loaded in the seal producing apparatus is in the square-shaped seal-type group, and said calling portion permits calling of a file associated with a seal type in the elongated rectangular-shaped seal-type group only when the seal type of the seal loaded in the seal producing apparatus is in the elongated rectangular-shaped seal-type group.

6. A seal producing apparatus as claimed in claim 5 wherein the square-shaped seal-type group includes circular-shaped seals and square-shaped seals.

7. A seal producing apparatus in which an imprint pattern according to an input character string is formed on a seal face member of a seal, said seal producing apparatus comprising:

loaded-seal replacement detection means for detecting, while the seal producing apparatus is in a character string input state, that a new seal is loaded in the seal producing apparatus replacing a previously loaded seal; and character string maintenance/deletion control means which maintains an input character string held before the replacement of the previously loaded seal by the newly loaded seal when a predetermined relationship is established between seal types of the previously and newly loaded seals before and after the replacement, but deletes the input character string held before the replacement of the previously loaded seal when the predetermined relationship is not established between seal types of the previously and newly loaded seals before and after the replacement;

said predetermined relationship being that the newly loaded seal is a seal type having a shape and size suitable to contain the allowable number of lines and the allowable number of characters per line in the seal type associated with the previously loaded seal and that the size of the seal type of the newly loaded seal is equal to or larger than the size of the seal type of the previously loaded seal.

8. A seal producing apparatus as claimed in claim 7 wherein the seal types are categorized by their character string receiving area into a square-shaped seal-type group and an elongated-rectangular-shaped seal-type group and said character string maintenance/deletion control means maintains the input character string when the input character string is associated with a seal type in the square-shaped seal-type group only when the seal type of the newly loaded seal in the seal producing apparatus is in the square-shaped seal-type group, and deletes the input character string when the input character string is associated with a seal type in the elongated-rectangular-shaped seal-type group.

9. A seal producing apparatus as claimed in claim 8 wherein the square-shaped seal-type group includes circular-shaped seals and square-shaped seals.

10. A seal producing apparatus as claimed in claim 8 wherein the character string maintenance/deletion control means maintains the input character string during a power off condition.

11. A seal producing apparatus as claimed in claim 7 wherein the seal types are categorized by their character string receiving area into a square-shaped seal-type group and an elongated-rectangular-shaped seal-type group and said character string maintenance/deletion control means maintains the input character string when the input character string is associated with a seal type in the elongated-rectangular-shaped seal-type group only when the seal type of the newly loaded seal in the seal producing apparatus is in the elongated-rectangular-shaped seal-type group, and deletes the input character string when the input character string is associated with a seal type in the square-shaped seal-type group.

12. A seal producing apparatus as claimed in claim 7 wherein the seal types are categorized by their character string receiving area into a square-shaped seal-type group and a elongated-rectangular-shaped seal-type group; said character string maintenance/deletion control means maintains the input character string when the input character string is associated with a seal type in the square-shaped seal-type group only when the seal type of the newly loaded seal in the seal producing apparatus is in the square-shaped seal-type group, and deletes the input character string when the input character string is associated with a seal type in the elongated-rectangular-shaped seal-type group; and said character string maintenance/deletion control means maintains the input character string when the input character string is associated with a seal type in the elongated-rectangular-shaped seal-type group only when the seal type of the newly loaded seal in the seal producing apparatus is in the elongated-rectangular-shaped seal-type group, and deletes the input character string when the input character string is associated with a seal type in the square-shaped seal-type group.

13. A seal producing apparatus as claimed in claim 12 wherein the square-shaped seal-type group includes circular-shaped seals and square-shaped seals.

14. A seal producing apparatus as claimed in claim 12 wherein the character string maintenance/deletion control means maintains the input character string during a power off condition.

15. A seal producing apparatus as claimed in claim 7 wherein the character string maintenance/deletion control means maintains the input character string during a power off condition.

* * * * *